(12) United States Patent
Zauner et al.

(10) Patent No.: US 8,956,464 B2
(45) Date of Patent: Feb. 17, 2015

(54) METHOD OF CLEANING MEMBRANES

(75) Inventors: Peter Zauner, Springwood (AU); Fufang Zha, West Ryde (AU)

(73) Assignee: Evoqua Water Technologies LLC, Warrendale, PA (US)

( * ) Notice: Subject to any disclaimer, the term of this patent is extended or adjusted under 35 U.S.C. 154(b) by 195 days.

(21) Appl. No.: 12/813,748

(22) Filed: Jun. 11, 2010

(65) Prior Publication Data
US 2011/0056522 A1 Mar. 10, 2011

(30) Foreign Application Priority Data
Jun. 11, 2009 (AU) ................. 2009902681

(51) Int. Cl.
*B01D 65/02* (2006.01)

(52) U.S. Cl.
CPC .......... *B01D 65/02* (2013.01); *B01D 2321/168* (2013.01)
USPC .............................. 134/27; 134/28

(58) Field of Classification Search
CPC ............. B01D 2331/168; B01D 65/02; B01D 2311/12; B01D 2321/162; B01D 2321/164; B01D 65/06; B08B 3/08; C11D 11/0664; C11D 3/0042; C11D 7/08
USPC ..................................... 134/27, 28
See application file for complete search history.

(56) References Cited

U.S. PATENT DOCUMENTS

| | | | |
|---|---|---|---|
| 256,008 A | 4/1882 | Leak | |
| 285,321 A | 9/1883 | Tams | |
| 511,995 A | 1/1894 | Buckley | |
| 1,997,074 A | 4/1935 | Novotny | |
| 2,080,783 A | 5/1937 | Petersen | |
| 2,105,700 A | 1/1938 | Ramage | |
| 2,843,038 A | 7/1958 | Manspeaker | |
| 2,926,086 A | 2/1960 | Chenicek et al. | |
| 3,068,655 A | 12/1962 | Murray et al. | |
| 3,139,401 A | 6/1964 | Hach | |
| 3,183,191 A | 5/1965 | Hach | |
| 3,191,674 A | 6/1965 | Richardson | |
| 3,198,636 A | 8/1965 | Bouthilet | |
| 3,228,876 A | 1/1966 | Mahon | |
| 3,275,554 A | 9/1966 | Wagenaar | |

(Continued)

FOREIGN PATENT DOCUMENTS

| | | |
|---|---|---|
| AU | 34400/84 A | 4/1985 |
| AU | 55847/86 A | 9/1986 |

(Continued)

OTHER PUBLICATIONS

Almulla et al., Desalination, 153 (2002), pp. 237-243.

(Continued)

*Primary Examiner* — Michael Kornakov
*Assistant Examiner* — Katelyn Whatley

(57) ABSTRACT

Methods for cleaning polymeric microfiltration or ultrafiltration membranes. The membrane may be contacted with a first cleaning solution including at least one oxidising agent. A second cleaning solution including at least one reducing agent may then be introduced to the membrane and first cleaning solution. The oxidising and reducing agents may undergo a neutralisation reaction to form an oxidation-neutral mixed cleaning solution. The membrane may be simultaneously cleaned during the neutralisation reaction.

24 Claims, 4 Drawing Sheets

(56) References Cited

U.S. PATENT DOCUMENTS

| | | |
|---|---|---|
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,912,624 A | 10/1975 | Jennings |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |

(56) References Cited

U.S. PATENT DOCUMENTS

| | | |
|---|---|---|
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H001045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A * | 7/1997 | Kawanishi et al. ........... 210/636 |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |

(56) References Cited

U.S. PATENT DOCUMENTS

| | | |
|---|---|---|
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Guibert et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 * | 1/2005 | Gill et al. .................. 134/22.12 |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |

(56) References Cited

U.S. PATENT DOCUMENTS

| | | |
|---|---|---|
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0035779 A1 | 2/2004 | Vossenkaul et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0095741 A1 | 5/2007 | Berends |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1* | 7/2007 | Elefritz et al. ................ 210/605 |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |

(56) References Cited

U.S. PATENT DOCUMENTS

| | | | |
|---|---|---|---|
| 2010/0000941 | A1 | 1/2010 | Muller |
| 2010/0012585 | A1 | 1/2010 | Zha et al. |
| 2010/0025320 | A1 | 2/2010 | Johnson |
| 2010/0051545 | A1 | 3/2010 | Johnson et al. |
| 2010/0170847 | A1 | 7/2010 | Zha et al. |
| 2010/0200503 | A1 | 8/2010 | Zha et al. |
| 2010/0300968 | A1 | 12/2010 | Liu et al. |
| 2010/0326906 | A1 | 12/2010 | Barnes |
| 2011/0023913 | A1* | 2/2011 | Fulling .................... 134/29 |
| 2011/0049047 | A1 | 3/2011 | Cumin et al. |
| 2011/0049048 | A1 | 3/2011 | Benner et al. |
| 2011/0100907 | A1 | 5/2011 | Zha et al. |
| 2011/0114557 | A2 | 5/2011 | Johnson et al. |
| 2011/0127209 | A1 | 6/2011 | Rogers et al. |
| 2011/0132826 | A1 | 6/2011 | Muller et al. |
| 2011/0139715 | A1 | 6/2011 | Zha et al. |
| 2011/0192783 | A1 | 8/2011 | Cox et al. |
| 2011/0198283 | A1 | 8/2011 | Zha et al. |
| 2012/0074053 | A1 | 3/2012 | Collignon et al. |
| 2012/0091602 | A1 | 4/2012 | Cumin et al. |
| 2012/0187044 | A1 | 7/2012 | Zha et al. |
| 2012/0285885 | A1 | 11/2012 | James et al. |
| 2013/0037467 | A1 | 2/2013 | Biltoft et al. |
| 2013/0056426 | A1 | 3/2013 | Barnes |
| 2013/0153496 | A1 | 6/2013 | Zha et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898 Y | 8/1995 |
| CN | 2236049 Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52078677 A | 7/1977 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60-206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A | 12/1989 |
| JP | 02-017925 | 1/1990 |

(56) References Cited

FOREIGN PATENT DOCUMENTS

| | | |
|---|---|---|
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06277469 A | 10/1994 |
| JP | 06285496 A | 10/1994 |
| JP | 06292820 A | 10/1994 |
| JP | 06343837 A | 12/1994 |
| JP | 07000770 A | 1/1995 |
| JP | 07024272 A | 1/1995 |
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07-256253 | 10/1995 |
| JP | 07251043 A | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000-093758 | 4/2000 |
| JP | 2000-157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001-510396 T | 7/2001 |

(56) References Cited

FOREIGN PATENT DOCUMENTS

| | | | |
|---|---|---|---|
| JP | 2001179059 A | 7/2001 | |
| JP | 2001179060 A | 7/2001 | |
| JP | 2001190937 A | 7/2001 | |
| JP | 2001190938 A | 7/2001 | |
| JP | 2001205055 A | 7/2001 | |
| JP | 2001212587 A | 8/2001 | |
| JP | 2001232160 A | 8/2001 | |
| JP | 2001-269546 | 10/2001 | |
| JP | 2002011472 A | 1/2002 | |
| JP | 2002143849 A | 5/2002 | |
| JP | 2002177746 A | 6/2002 | |
| JP | 3302992 B2 | 7/2002 | |
| JP | 2002-527229 A | 8/2002 | |
| JP | 2002525197 T | 8/2002 | |
| JP | 2002263407 A | 9/2002 | |
| JP | 2002-336663 | 11/2002 | |
| JP | 2003024751 | 1/2003 | |
| JP | 2003047830 A | 2/2003 | |
| JP | 2003053157 A | 2/2003 | |
| JP | 2003053160 A | 2/2003 | |
| JP | 200371254 A | 3/2003 | |
| JP | 2003062436 A | 3/2003 | |
| JP | 2003135935 A | 5/2003 | |
| JP | 2003190976 A | 7/2003 | |
| JP | 2003-265597 | 9/2003 | |
| JP | 2003-275548 A | 9/2003 | |
| JP | 2003266072 A | 9/2003 | |
| JP | 2003275759 A | 9/2003 | |
| JP | 2003340250 A | 12/2003 | |
| JP | 2004-008981 | 1/2004 | |
| JP | 2004073950 A | 3/2004 | |
| JP | 2004-230287 A | 8/2004 | |
| JP | 2004216263 A | 8/2004 | |
| JP | 2004230280 A | 8/2004 | |
| JP | 2004249168 A | 9/2004 | |
| JP | 2004322100 A | 11/2004 | |
| JP | 2004337730 A * | 12/2004 | ............. B01D 65/06 |
| JP | 2004536710 A | 12/2004 | |
| JP | 2005502467 A | 1/2005 | |
| JP | 2005087887 A | 4/2005 | |
| JP | 2005144291 A | 6/2005 | |
| JP | 2005154551 A | 6/2005 | |
| JP | 2005279447 A | 10/2005 | |
| JP | 2006-116495 | 5/2006 | |
| JP | 2007-547083 | 8/2010 | |
| JP | 4833353 B2 | 12/2011 | |
| KR | 20-0232145 | 7/2001 | |
| KR | 1020020067227 | 8/2002 | |
| KR | 20-0295350 | 11/2002 | |
| KR | 2002-0090967 | 12/2002 | |
| KR | 2003-033812 | 5/2003 | |
| KR | 2003-060625 | 7/2003 | |
| KR | 2005-063478 | 6/2005 | |
| NL | 1006390 C2 | 12/1998 | |
| NL | 1020491 | 10/2003 | |
| NL | 1021197 | 10/2003 | |
| NO | 20053769 A | 2/2006 | |
| NZ | 510394 A | 5/2003 | |
| NZ | 537874 A | 2/2007 | |
| TW | 347343 | 12/1998 | |
| WO | 8501449 A1 | 4/1985 | |
| WO | 8605116 A1 | 9/1986 | |
| WO | 8605705 A1 | 10/1986 | |
| WO | 8800494 A1 | 1/1988 | |
| WO | 8801529 A1 | 3/1988 | |
| WO | 8801895 A1 | 3/1988 | |
| WO | 8806200 A1 | 8/1988 | |
| WO | 8900880 A1 | 1/1989 | |
| WO | 9000434 A1 | 1/1990 | |
| WO | 9104783 A1 | 4/1991 | |
| WO | 9116124 A1 | 10/1991 | |
| WO | 9302779 A1 | 2/1993 | |
| WO | 9315827 A1 | 8/1993 | |
| WO | 9323152 A1 | 11/1993 | |
| WO | 9411094 A1 | 5/1994 | |
| WO | 9511736 A1 | 5/1995 | |
| WO | 9534424 A1 | 12/1995 | |
| WO | 9603202 A1 | 2/1996 | |
| WO | 9607470 A1 | 3/1996 | |
| WO | 9628236 A1 | 9/1996 | |
| WO | 9629142 A1 | 9/1996 | |
| WO | 9641676 A1 | 12/1996 | |
| WO | 9706880 A2 | 2/1997 | |
| WO | 9822204 A1 | 5/1998 | |
| WO | 9825694 A1 | 6/1998 | |
| WO | 9828066 A1 | 7/1998 | |
| WO | 9853902 A1 | 12/1998 | |
| WO | 9901207 A1 | 1/1999 | |
| WO | 99-55448 A1 | 11/1999 | |
| WO | 9959707 A1 | 11/1999 | |
| WO | 0018498 A1 | 4/2000 | |
| WO | 0030742 A1 | 6/2000 | |
| WO | 0100307 A2 | 1/2001 | |
| WO | 0105715 A1 | 1/2001 | |
| WO | 0108790 A1 | 2/2001 | |
| WO | 0119414 A1 | 3/2001 | |
| WO | 0132299 A1 | 5/2001 | |
| WO | 0136075 A1 | 5/2001 | |
| WO | 0143856 A1 | 6/2001 | |
| WO | 0145829 A1 | 6/2001 | |
| WO | 0226363 A2 | 4/2002 | |
| WO | 0230550 A1 | 4/2002 | |
| WO | 0240140 A1 | 5/2002 | |
| WO | 0247800 A1 | 6/2002 | |
| WO | 03000389 A2 | 1/2003 | |
| WO | 03013706 A1 | 2/2003 | |
| WO | 03024575 A1 | 3/2003 | |
| WO | 03053552 A1 | 7/2003 | |
| WO | 03057632 A1 | 7/2003 | |
| WO | 03059495 A1 | 7/2003 | |
| WO | 03068374 A1 | 8/2003 | |
| WO | 03095078 A1 | 11/2003 | |
| WO | 2004018084 A1 | 3/2004 | |
| WO | 2004024304 A2 | 3/2004 | |
| WO | 2004033078 A1 | 4/2004 | |
| WO | 2004050221 A1 | 6/2004 | |
| WO | 2004056458 A3 | 7/2004 | |
| WO | 2004078327 A1 | 9/2004 | |
| WO | 2004101120 A1 | 11/2004 | |
| WO | 2005005028 A1 | 1/2005 | |
| WO | 2005021140 A1 | 3/2005 | |
| WO | 2005028085 A1 | 3/2005 | |
| WO | 2005028086 A1 | 3/2005 | |
| WO | 2005037414 A1 | 4/2005 | |
| WO | 2005046849 A1 | 5/2005 | |
| WO | 2005077499 A1 | 8/2005 | |
| WO | 2005082498 A1 | 9/2005 | |
| WO | 2005107929 A2 | 11/2005 | |
| WO | 2006026814 A1 | 3/2006 | |
| WO | 2006029456 A1 | 3/2006 | |
| WO | 2006029465 | 3/2006 | |
| WO | 2006047814 A1 | 5/2006 | |
| WO | 2006066350 A1 | 6/2006 | |
| WO | WO 2006066319 A1 * | 6/2006 | |
| WO | 2007053528 A2 | 5/2007 | |
| WO | 2007065956 A1 | 6/2007 | |
| WO | 2007135087 A1 | 11/2007 | |
| WO | 2008025077 A1 | 3/2008 | |
| WO | 2008034570 A1 | 3/2008 | |
| WO | 2008071516 A1 | 6/2008 | |
| WO | 2008141080 A1 | 11/2008 | |
| WO | 2008153818 A1 | 12/2008 | |
| WO | 2009030405 A1 | 3/2009 | |
| WO | WO2009030405 * | 3/2009 | |

OTHER PUBLICATIONS

Anonymous, "Nonwoven Constructions of Dyneon" THV and Dyneon "THE Fluorothermoplastics", Research Disclosure Journal, Apr. 1999, RD 420013, 2 pages.

Cote et al., Wat. Sci. Tech. 38(4-5) (1998), pp. 437-442.

Cote, et al. "A New Immersed Membrane for Pretreatment to Reverse Osmosis" Desalination 139 (2001) 229-236.

(56) References Cited

OTHER PUBLICATIONS

Craig, Jones, "Applications of Hydrogen Peroxide and Derivatives," The Royal Society of Chemistry, Cambridge, UK 1999 Chapters 2 and 5.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent, N. et al., Desalination 131 (2000) 353-362.

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

International Search Report and the Written Opinion dated Oct. 4, 2010 for Application No. PCT/EP2010/057998.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system" Water Research, Elsevier, Amsterdam, NL, vol. 37, No. 5, Mar. 2003.

Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Mark et al., "Peroxides and Peroxy Compounds, Inorganic" Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.

MicroCTM—Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.

Rosenberger et al., Desalination, 151 (2002), pp. 195-200.

U.S. Appl. No. 60/278,007, filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwmrw.interscience.wiley.com/eow/.

White et al., The Chemical Engineering Journal, 52 (1993), pp. 73-77.

Wikipedia, "Seawater," available at http://en.wikipedia.org/wiki/Seawater, Jul. 15, 2007.

Yamamoto et al., Water Science Technology, vol. 2, pp. 43-54; 1989.

Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

Zenon, "Proposal for ZeeWeed® Membrane Filtration Equipment System for the City of Westminster, Colorado, Proposal No. 479-99," Mar. 2000, entire publication.

"Chemical Cleaning Definition", Lenntech BV, Lenntech Water treatment & purification Holding B.V., Chemical Cleaning.

Coulson et al., "Coulson and Richardson's Chemical Engineering," 1999, vol. 1, pp. 358-364.

Cui et al., "Airlift crossflow membrane filtration—a feasibility study with dextran ultrafiltration," J. Membrane Sci. (1997) vol. 128, pp. 83-91.

International Preliminary Report on Patentability dated Dec. 22, 2011 for Application No. PCT/EP2010/057998.

Australian Innovation Patent Examination Report No. 1 dated Feb. 8, 2013 for Application No. 2010101488.

* cited by examiner

METHOD OF CLEANING MEMBRANES

CROSS-REFERENCE TO RELATED APPLICATION

This application claims priority under Section 119 to Australian Provisional Patent Application No. AU2009902681 filed on Jun. 11, 2009 which is hereby incorporated herein by reference in its entirety for all purposes.

FIELD OF THE TECHNOLOGY

One or more aspects relate to methods for cleaning polymeric microfiltration or ultrafiltration membranes. One or more aspects particularly relate to methods for chemical cleaning of membranes designed to minimise volume of chemical waste discharged and chemical damage to the environment, particularly microbial systems in membrane bioreactors.

BACKGROUND

Synthetic membranes are used for a variety of applications including desalination, gas separation, filtration and dialysis. The properties of the membranes vary depending on the morphology of the membrane i.e. properties such as symmetry, pore shape, pore size and the material used to form the membrane.

In membrane separation processes, it is critical that the pores of the membrane be kept relatively free of contaminants. Over time, membrane pores will become blocked with contaminants and a 'filter cake' will form on the membrane surface, thereby restricting access of contaminated fluid to the membrane. This is known as membrane fouling. Membrane fouling is defined as the process in which solute or particles deposit onto the membrane surface or into membrane pores such that membrane performance deteriorates. Untreated fouling of the membrane results in membrane performance degradation that can ultimately diminish the lifetime of membrane units.

SUMMARY

One or more aspects relate generally to chemical cleaning of membranes.

In accordance with one or more embodiments, a method for cleaning a porous polymeric membrane may comprise introducing a first cleaning solution including an oxidising agent to a tank containing the membrane, contacting at least a portion of the membrane with the first cleaning solution for a first time period, introducing a second cleaning solution including a reducing agent to the tank containing the membrane and the first cleaning solution after the first time period has elapsed to neutralize an oxidizing residual of the first cleaning solution and to form a mixed cleaning solution containing an acid species, contacting at least a portion of the membrane with the mixed cleaning solution containing the acid species for a second time period and discharging the mixed cleaning solution from the tank after the second time period has elapsed.

In some embodiments, said membrane is a hollow-fibre membrane. The oxidising agent may be a chlorine-based oxidising agent selected from the group consisting of chlorine, hypochlorites, chlorites, chlorates, perchlorates, chlorine dioxide and chloramines. In at least one embodiment, said oxidising agent is sodium hypochlorite, chlorine dioxide or monochloramine. The reducing agent is selected to neutralise the oxidising residual from said oxidising agent. In some embodiments, said reducing agent is selected from the group consisting of bisulphites, metabisulfites, sulphites and thiosulfates. In at least one embodiment, said reducing agent is sodium metabisulfite, sodium thiosulphate, or sodium bisulfite.

In some embodiments, said second cleaning solution further includes an enhancing agent. The enhancing agent may be a surfactant or a chelating agent selected from the group consisting of polycarboxylic acids and salts thereof. In at least one embodiment, the enhancing agent is citric acid or a salt thereof, ethylenediaminetetraacetic acid (EDTA) or a salt thereof, or oxalic acid or a salt thereof.

In some embodiments, the concentration of said oxidising agent in said first cleaning solution is between 0.01 wt % and 2 wt %. In at least one embodiment, the concentration of said oxidising agent in said first cleaning solution is approximately 0.1 wt %. In some embodiments, a concentration of said reducing agent is between 0.01 wt % and 2 wt %. In at least one embodiment, the concentration of said reducing agent is approximately 0.15 wt %. In some embodiments, a concentration of said enhancing agent is between 0.01 wt % and 1.0 wt %. In at least one embodiment, the concentration of said enhancing agent is 0.5 wt %.

In some embodiments, the first time period is at least about three hours, and wherein the second time period is at least about two hours. In certain embodiments, said membrane is cleaned at ambient temperature and pressure. In some embodiments, the method further comprises recirculating at least one of the first cleaning solution and the mixed cleaning solution in the tank. In other embodiments, the method may further comprise filtering at least one of the first cleaning solution and the mixed cleaning solution through the membrane. In at least some embodiments, the method may further comprise soaking the membrane in at least one of the first cleaning solution and the mixed cleaning solution. In accordance with some embodiments, the method may further comprise air scouring the membrane while contacting the membrane with at least one of the first cleaning solution and the mixed cleaning solution. In some embodiments, the second solution is introduced while backwashing the membrane.

In some embodiments, the method may further comprise adjusting a pH level of the discharged mixed cleaning solution. In at least one embodiment, the first cleaning solution targets organic membrane foulants, and wherein the mixed cleaning solution containing the acidic species targets inorganic membrane foulants.

In accordance with one or more embodiments, a method of facilitating cleaning of a porous polymeric membrane in place may comprise providing a first cleaning solution including at least one oxidising agent and a second cleaning solution including at least one reducing agent, and providing instructions to contact at least a portion of the membrane with the first cleaning solution for a first time period to target organic membrane foulants, introduce the second cleaning solution to the first cleaning solution after the first time period has elapsed to form a mixed cleaning solution containing an acid species, and contact at least a portion of the membrane with the mixed cleaning solution containing the acid species for a second time period to target inorganic membrane foulants.

In some embodiments, the method may further comprise providing instructions to discharge the mixed cleaning solution after the second time period has elapsed. In at least one embodiment, the method may further comprise providing instructions to adjust a pH level of the discharged mixed cleaning solution.

According to a first aspect, a method for cleaning a porous polymeric membrane may include the steps of contacting said membrane with a first cleaning solution including at least one oxidising agent, and contacting said membrane and said first cleaning solution with a second cleaning solution including at least one reducing agent wherein said oxidising and reducing agents undergo a neutralisation reaction to form an oxidation-neutral mixed cleaning solution such that said membrane is simultaneously cleaned during said neutralisation reaction. The membrane is preferably a hollow fibre membrane and is a fouled membrane in a preferred embodiment. The mixed cleaning solution is preferably rendered acidic by the neutralisation reaction to further remove membrane foulants during the clean. The mixed cleaning solutions may be pH neutral following further chemical treatment when discharged. The membrane recovery following the clean is preferably equivalent to membrane recovery following contact with a first cleaning solution which is subsequently discharged succeeded by contact with a second cleaning solution which is then further subsequently discharged.

The oxidising agent may be a chlorine-based oxidising agent wherein the oxidising agent is preferably selected from a group consisting of chlorine, hypochlorites, chlorites, chlorates, perchlorates, chlorine dioxide and chloramines. In a particularly preferred embodiment, the oxidising agent is sodium hypochlorite. In another embodiment, the oxidising agent is chlorine dioxide. In still another embodiment, the oxidising agent is monochloramine.

The reducing agent may be selected to neutralise the chlorine residual from the oxidising agent and is preferably selected from the group consisting of bisulphites, metabisulfites, sulphites or thiosulfates. In a particularly preferred embodiment, the reducing agent is sodium metabisulfite. In another embodiment, the reducing agent is sodium thiosulphate. In still another embodiment, the reducing agent is sodium bisulfite.

In some embodiments, the second cleaning solution further includes an enhancing agent. The enhancing agent is preferably selected from a group consisting of surfactants and chelating agents. In preferred embodiments, the enhancing agent is selected from the group consisting of polycarboxylic acids or salts thereof. In one embodiment, the enhancing agent is citric acid or a salt thereof. In another embodiment, the enhancing agent is ethylenediaminetetraacetic acid (EDTA) or a salt thereof. In still another embodiment, the enhancing agent is oxalic acid or a salt thereof.

In some embodiments, the concentration of the oxidising agent in the first cleaning solution is between 0.01 wt % and 2 wt %. Preferably, the concentration of the oxidising agent in the first cleaning solution is 0.1 wt %. The concentration of the reducing agent is preferably between 0.01 wt % and 2 wt %. The concentration of the reducing agent is approximately 0.15 wt % in particularly preferred embodiments. The concentration of enhancing agent is preferably between 0.01 wt % and 1.0 wt %, and is most preferably 0.5 wt %.

According to another aspect, a method for cleaning a porous polymeric membrane may include the steps of contacting said membrane with a first cleaning solution including at least one oxidising agent selected from a group consisting of sodium hypochlorite, chlorine dioxide or monochloramine, and contacting said membrane and said first cleaning solution with a second cleaning solution including at least one reducing agent selected from a group consisting of sodium metabisulfite, sodium thiosulphate or sodium bisulfite and an enhancing agent selected from the group consisting of polycarboxylic acids or salts thereof, wherein said oxidising and reducing agents undergo a neutralisation reaction to form an oxidation-neutral mixed cleaning solution such that said membrane is simultaneously cleaned with an acidic species generated during said neutralisation reaction. The membrane is preferably a hollow fibre membrane and is a fouled membrane in a preferred embodiment. In a preferred embodiment, the membrane is contacted with the first cleaning solution for at least 3 hours followed by contact with the second cleaning solution for at least two hours prior to discharge of oxidation-neutral mixed cleaning solution. The neutralisation reaction preferably produces acidic species to remove inorganic foulants on the membrane. The acidic species is preferably further neutralised prior to discharge. Contact with the membrane occurs at ambient temperature and pressure in a preferred embodiment. The contact with the membrane preferably includes periods of filtration, air scouring and/or soaking.

According to another aspect, a kit for cleaning a porous polymeric membrane may be provided including a first cleaning solution including at least one oxidising agent, and a second cleaning solution, including at least one reducing agent and an enhancing agent, as a dosage regime together with instructions for cleaning the porous polymeric membrane according to a method whereby said membrane is contacted with said first cleaning solution for a period of time subsequently followed by contact with said second cleaning solution such that said oxidising and reducing agents undergo a neutralisation reaction to form an oxidation-neutral mixed cleaning solution and whereby said membrane is simultaneously cleaned with an acidic species generated during said neutralisation reaction.

Still other aspects, embodiments, and advantages of these exemplary aspects and embodiments, are discussed in detail below. Other advantages, novel features and objects will become apparent from the following detailed description when considered in conjunction with the accompanying drawings. Moreover, it is to be understood that both the foregoing information and the following detailed description are merely illustrative examples of various aspects and embodiments, and are intended to provide an overview or framework for understanding the nature and character of the claimed aspects and embodiments.

The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The accompanying drawings are not intended to be drawn to scale. In the drawings, each identical or nearly identical component that is illustrated in various figures is represented by like numeral. For purposes of clarity, not every component may be labeled in every drawing. Preferred, non-limiting embodiments will be described with reference to the accompanying drawings, in which.

DETAILED DESCRIPTION

Figure 1:
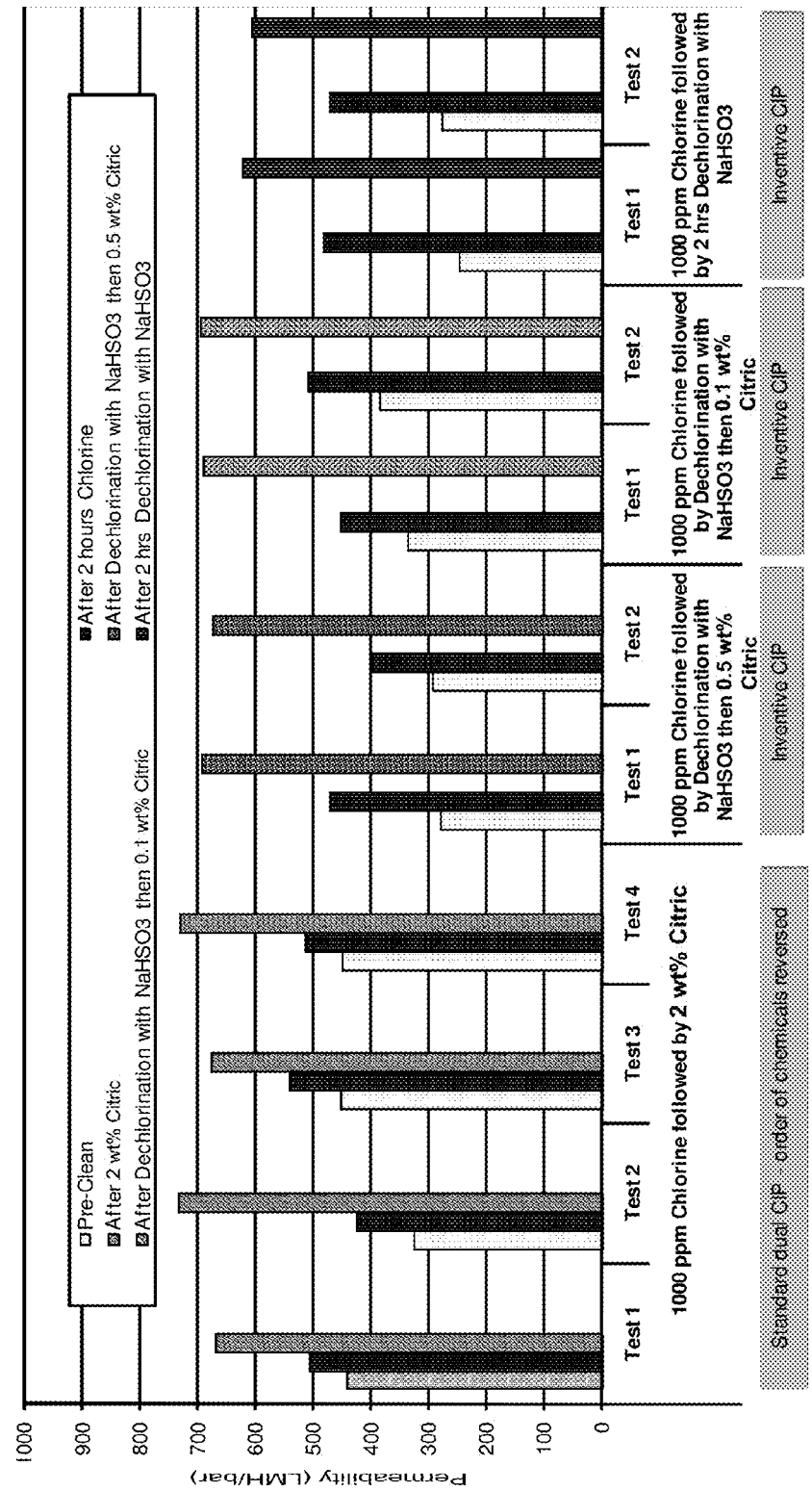
FIG. 1 shows the membrane permeability recovery of PVDF (polyvinylidene fluoride) hollow-fibre membrane samples cleaned in the laboratory using a standard CIP protocol compared to samples cleaned with the cleaning protocol of the present invention.

One or more embodiments may relate generally to a chemical cleaning protocol for polymeric membranes used in wastewater filtration. Disclosed embodiments may maintain the efficacy of membranes while limiting the discharged wastewater volumes and chemical cost when chemical waste cannot be returned to the head of the plant.

Different membranes can be used for specific separation processes, including microfiltration (MF), ultrafiltration (UF), nanofiltration (NF) and reverse osmosis (RO). Membrane processes are carried out under differential pressure and are distinguished by the size of the particle or molecule that the membrane is capable of retaining or passing.

In membrane water filtration, a membrane can foul irreversibly with both organic and inorganic foulants and can become useless. Fouling can be divided into reversible and irreversible fouling based on the attachment strength of particles to the membrane surface. Layers of fouling particles will typically build on the membrane surface. Generally, membrane fouling that can be removed by hydraulic cleaning, such as backwashing and gas scouring, is defined as reversible fouling. A backwashing process involves reversing filtrate flow to dislodge foulants that have accumulated on the membrane surface and in the pores.

If not sufficiently removed, a reversible fouling layer can be transformed over time into an irreversible fouling layer. Irreversible fouling is the result of a fouling layer being attached to the membrane such that it cannot be removed by a physical cleaning method alone. Irreversible fouling cannot be removed by simple hydraulic cleaning, but requires more intensive chemical cleaning to break the attachment to the membrane. Both types of fouling can take place on the membrane surface or in the membrane pores. As the degree of membrane pore blockage increases, the filtration efficiency of the module decreases resulting in lower product volume and quality.

In order to maximise membrane lifetime and maintain operation efficiency, irreversible fouling must be removed on a regular basis. Membrane chemical cleaning is an integral part of operation for micro- and ultrafiltration systems, particularly in the water industry and has significant impact on process operations. Severe membrane fouling may require intense chemical cleaning or membrane replacement. There are various types of foulants namely colloidal (clays, flocs), biological (bacteria, fungi), organic (oils, polyelectrolytes, humics) and inorganic scaling (mineral precipitates). These can be collectively divided into organic and inorganic fouling layers on the membrane.

'Clean-In-Place' (CIP) is well known in the art as a chemical cleaning method used to reduce fouling by reaction and removal of foulants from the membrane surface. Inorganic acids and bases are the mainstay of conventional cleaning agents. Sodium hydroxide and basic oxidising agents are generally used to remove organic foulants. Inorganic acids, such as sulphuric and hydrochloric acid, are often used to remove inorganic foulants. Weaker acids, such as citric acid, such as sulphuric, hydrochloric or nitric acid, may also be used. However, the pH of weaker acids is generally adjusted with a mineral acid to reduce chemical usage without compromising cleaning efficacy. A typical dual chemical clean involves a clean with an acid solution followed by a clean with a basic solution.

Spent chemical cleaning solutions require disposal following a chemical clean. Chemical cleaning waste may be readily disposed of by returning to the head of the treatment plant if it is sufficiently diluted and neutralised by large incoming wastewater flows. However, in a number of situations this is not possible, as it would lead to the upset of plant microbiology or generate an unacceptable build up of toxins that will be discharged back into the filtration process. This is particularly the case with treatment plants that operate with smaller wastewater volumes or with membrane bioreactor (MBR) filtration plants where chemical concentrations in the water flow can damage the biomass at the treatment plant. In some cases, particularly where MBR filtration is concerned, plant operators specify that no active chemical waste be discharged back into the treatment system. In such situations, the spent chemical cleaning solutions must be neutralised prior to discharge, increasing waste water volume for discharge, and often requiring the use of additional chemicals. This leads to increased operating costs for increased wastewater discharge volumes and further increases system downtime required for the membrane clean.

However, in order to reduce membrane fouling and maintain the efficiency of the operation of a membrane plant, chemical cleaning is undoubtedly necessary. This is particularly the case when the feed to be treated contains a significant quantity of membrane foulants. Balance is often needed between the need to maintain efficient plant operation, operating cost and impact on the treatment plant (particularly in biological treatment systems) with all three factors generally being compromised.

A conventional CIP protocol for a wastewater filtration plant typically involves a first clean with an acid solution to facilitate removal of inorganic foulants. The acid cleaning solution is then drained away for removal. This is followed by a clean with an oxidising agent or caustic for organic foulant removal. This second cleaning solution is then also drained away for removal. Thus, considerable volumes of wastewater are generated by the use of discrete acidic and basic cleaning solutions, as required for targeted foulant removal.

In accordance with one or more embodiments, a chemical cleaning protocol may involve a first cleaning solution contacting the membrane, wherein the first cleaning solution includes an oxidising agent, such as sodium hypochlorite. Alternative chemicals such as chlorine, hypochlorites, chlorites, chlorates, perchlorates, chlorine dioxide or chloramines may be used. Such chemicals may target organic foulants for relative removal of these foulants from the membrane surface.

The amount of chemical added to prepare the first cleaning solution may vary depending on the feedwater properties. Generally, the oxidising agent or caustic agent may be added such that the concentration of the first cleaning solution is between 0.01 wt % and 2 wt %. The exact concentration of the first cleaning solution may depend on the membrane foulants deposited on the membrane pores and surface as a result of varying feedwaters. Additional cleans with different, or the same, agents selected from the group mentioned above may be carried out depending on the degree of fouling on the membrane surface and pores.

The temperature of the first cleaning solution may typically be maintained at ambient conditions to limit cost and energy usage required for heating, as well as limiting the hazards associated with heated chemical solutions. The first cleaning solution may be contacted with the membrane for a recirculation period to improve the membrane contact with the cleaning solution, followed by soaking for a period of time. During this process, the organic membrane foulants may react with active chemicals contained in the first cleaning solution, thereby initiating the dislodgement of any filtercake present on the membrane surface and beginning to unblock clogged membrane pores. The chemical solution may typically be filtered from the "shell"-side of the membrane (from the outside wall of the membrane) to the lumen side (to the internal wall of the membrane) via suction pressure applied to the lumen side. Generally, the existing fluid on the "shell"-side (i.e. biomass) is drained off the membrane surface before cleaning commences. The existing fluid on the lumen side (i.e. filtrate) is typically retained before cleaning commences. To facilitate the cleaning process, filtering the cleaning solution may be used for a short period of time to allow the chemical species to penetrate into the membrane pores. Injecting air continuously or intermittently into the membranes during cleaning is another means to enhance solid removal and improve cleaning efficacy.

At this stage, in a CIP on a typical wastewater membrane filtration plant, the first chemical cleaning solution would be either (i) neutralised and discharged away from the plant or, in some cases (ii) returned to the head of the treatment plant. Particularly in the case of some MBR filtration plants, no chemical waste can be returned to the plant at all. In accordance with one or more embodiments, disclosed methods may use a second membrane cleaning solution to neutralise the oxidising capacity of the spent first cleaning solution to minimise costs, impact on the biomass of the treatment plant and volume of chemical waste discharge.

In accordance with one or more embodiments, a second cleaning solution containing a reducing agent may be prepared. In at least one embodiment, the reducing agent may be selected from the group consisting of bisulfites, metabisulfites, sulphites or thiosulfates. The reducing agent of the second cleaning solution may be selected to neutralise the oxidising residual from said first cleaning solution. The second cleaning solution containing the reducing agent may typically be added to the membrane tank containing the spent first cleaning solution to neutralise it. Alternatively, the second cleaning solution can be introduced into the membrane tank when the membranes are backwashed. During this process, the mixed first and second solutions are rendered acidic while simultaneously neutralising the oxidation residual of the first cleaning solution. If the oxidising agent is NaOCl, for example, and the reducing agent is sodium metabisulfite, then the neutralisation would be in accordance with the following general reaction:

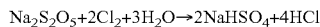

$$Na_2S_2O_5 + 2Cl_2 + 3H_2O \rightarrow 2NaHSO_4 + 4HCl$$

The acidic mixed solution is then effectively used to remove inorganic foulants. During the combination of the first cleaning solution with the second cleaning solution, the oxidising residual is neutralised and the inorganic membrane foulants simultaneously react with the active acid species generated from the neutralising reaction. The reducing agent of the second cleaning solution is also able to react with some membrane foulants such that they are easily washed off the membrane surface and out of the membrane pores. The dislodgement of filter cake present on the membrane surface is thereby continued, along with the unblocking of clogged membrane pores.

In the preferred embodiment, the spent first cleaning solution remains in the membrane tank and the second cleaning solution is directly introduced to the membrane tank, thereby neutralising the first cleaning solution and removing foulants from the membranes simultaneously. Thus, the first oxidising cleaning solution maintains contact with the membrane and neutralisation of the oxidising residual begins upon addition of the second reducing cleaning solution. The membrane is thereby simultaneously contacted with the mixed first and second cleaning solutions during the neutralisation reaction.

In a particularly preferred embodiment, an enhancing agent may be added to the second cleaning solution to augment the cleaning efficacy. The enhancing agent may be selected from a group consisting of surfactants and chelating agents, preferably polycarboxylic acids or salts thereof. In particularly preferred embodiments, the enhancing agent is citric acid, or ethylenediaminetetraacetic acid (EDTA). The concentration of the enhancing agent is typically in a range of 0.01% to 1%. Neutralised spent cleaning solutions may need pH adjustment before being discharged to the surrounding waterways, returned to a storage tank, to the wastewater inflows or to an alternative process stream.

As can be shown in the following examples, it has been surprisingly found that the cleaning efficacy of the disclosed embodiments is equivalent to that of a standard CIP, but avoids the need for separate neutralisation steps. A conventional CIP is conducted using a first cleaning solution, which is discharged separately followed by a second cleaning solution, which is then further separately discharged. Thus, in accordance with one or more embodiments, the disclosed cleaning methods can be used to maintain effective operation of a membrane plant, as with a standard chemical CIP protocol, additionally minimising cost, wastewater volume discharge and impact on the biomass associated with the neutralisation and discharge of the spent cleaning solutions.

The function and advantages of these and other embodiments will be more fully understood from the following examples. These examples are intended to be illustrative in nature and are not to be considered as limiting the scope of the systems and methods discussed herein.

EXAMPLE 1

Polymeric hollow fibre microfiltration membrane modules made from PVDF were exposed to sewage feed water/waste water. Following exposure to the feedwater for five consecutive months, a significant degree of both inorganic and organic fouling had built up on the membrane surface and in the membrane pores. Typically, membrane fouling from this particular feedwater source includes a combination of inorganic fouling such as iron and silica, and organic fouling. Following exposure to the feedwater, a significant degree of both inorganic and organic fouling had built up on the membrane surface and in the membrane pores.

Samples of hollow-fibre membranes from these modules were made into "mini-modules" of six fibres for cleaning trials in the laboratory. The first clean was carried out as a 2 hour soak of the fibre samples in a solution of 1000 ppm sodium hypochlorite to react with the organic membrane foulants. Following the first clean, residual oxidant in the form of chlorine from the hypochlorite solution requires neutralisation. Several different second cleaning solutions composed of 0.135 wt % sodium bisulphite, some also containing 0.1% and 0.5% citric acid, were prepared. Sufficient quantity of the spent first cleaning solution was then added to different second cleaning solutions, and the solutions briefly mixed before addition of the membrane samples previously soaked in the first cleaning solution alone. These samples were then soaked for 2 hours in the mixed cleaning solutions followed by filtration with RO-treated (reverse osmosis treated) water.

During this process, the neutralisation of the oxidising species takes place, along with a transition to an acidic pH, to react with and remove the inorganic foulants from the membrane surface. The citric acid is included with the sodium bisulfite to enhance the removal of the inorganic foulants from the membrane surface. However the reaction with the inorganic foulants will occur in the absence of citric acid also, as shown in the results from cleaning protocol 4 in Table 1 and FIG. 1.

Figure 2:
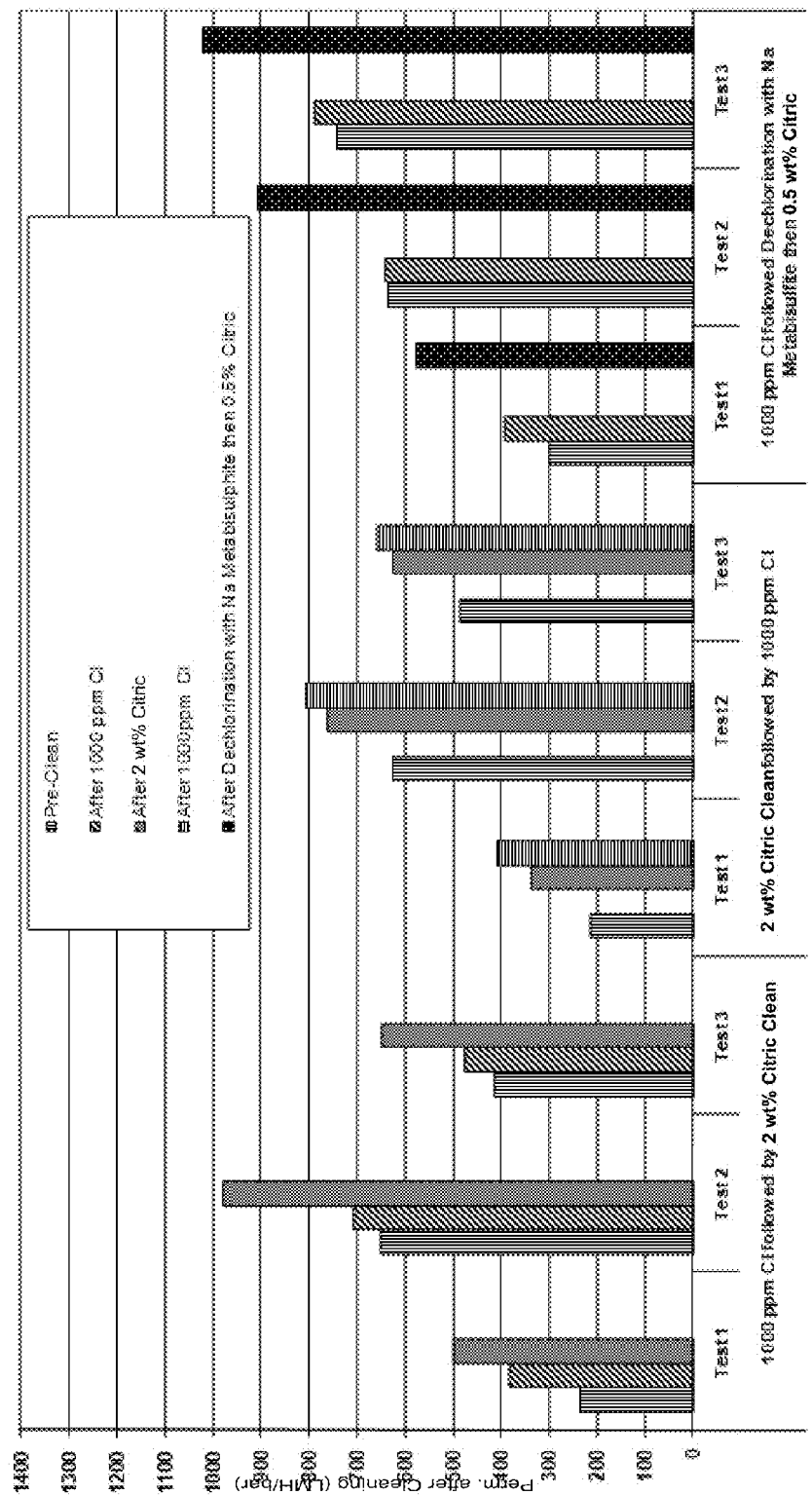
FIG. 2 is a graphical representation of the membrane permeability recovery of fouled PVDF hollow-fibre membrane modules cleaned on site using a standard CIP protocol compared to modules cleaned with the cleaning protocol of the present invention.

It should be noted that the percentage improvement value given in Table 1 and FIG. 1 refers to an improvement relative to the permeability of the membrane fibre before the chemical clean. No data was available for the original fibre permeability prior to exposure to any waste. Thus, an absolute permeability recovery percentage could not be provided. It is also evident that the degree of permeability improvement is strongly influenced by the degree of membrane fouling prior to the clean (i.e. a more fouled membrane is more likely that have a greater percentage improvement when cleaned compared to a membrane that is less fouled to begin with).

methods on membrane permeability recovery (see Table 2 and FIG. 2 for numerical/graphical results). A standard CIP protocol for membranes treating the feedwater in this instance uses ~1000 ppm sodium hypochlorite followed by ~2% citric acid or vice versa.

Polymeric microfiltration membrane modules made from PVDF were exposed to a sewage feed water/waste water stream. Following exposure to the feedwater, a significant degree of both inorganic and organic fouling had built up on the membrane surface and in the membrane pores.

Three sets of three fouled PVDF hollow-fibre microfiltration modules were subjected to a different chemical cleaning protocol to assess the effectiveness of each cleaning method on membrane permeability recovery. The pre-cleaning permeability ($L/m^2/h.bar$ or LMH/bar) is shown graphically for each module as a baseline for comparison.

TABLE 1

Laboratory Cleaning Study using different cleaning chemicals

| | | Permeability (LMH/bar) | | | | | | |
|---|---|---|---|---|---|---|---|---|
| Clean | Test | Pre-Clean | After 2 hours chlorine | After 2 wt % Citric | After NaHSO3 + 0.5 wt % Citric | After 2 hrs NaHSO$_3$ + 0.1 wt % citric | After 2 hrs NaHSO$_3$ | % Improvement from pre-clean permeability |
| 1000 ppm Chlorine then 2 wt % Citric | 1 | 443 | 507 | 669 | | | | 51 |
| | 2 | 327 | 425 | 735 | | | | 125 |
| | 3 | 453 | 542 | 676 | | | | 49 |
| | 4 | 449 | 514 | 730 | | | | 63 |
| 1000 ppm Chlorine then NaSO$_3$ and 0.5 wt % Citric | 1 | 281 | 471 | | 693 | | | 147 |
| | 2 | 293 | 400 | | 674 | | | 130 |
| 1000 ppm Chlorine then NaSO$_3$ and 0.1 wt % Citric | 1 | 337 | 452 | | | 690 | | 105 |
| | 2 | 384 | 510 | | | 695 | | 81 |
| 1000 ppm Chlorine then NaSO$_3$ | 1 | 248 | 482 | | | | 624 | 152 |
| | 2 | 276 | 471 | | | | 608 | 120 |

Following the cleaning protocol, a spent cleaning solution was rendered pH neutral following treatment with sodium hydroxide and freely discharged without the addition of further chemicals. A spent cleaning solution is one in which the oxidative potential has been used and little or no oxidative potential remains. The results in Table 1 indicate the membrane permeability following each recovery clean. The permeability of a membrane indicates the ease with which fluid can pass through the membrane. A significantly fouled membrane will necessarily have a much lower permeability than a clean, unfouled membrane.

The results in Table 1 indicate that cleaning protocol 4 (1000 ppm chlorine followed by dechlorination with sodium bisulfite) provides an effective operational membrane permeability recovery. It is also shown that an addition of a small quantity of citric acid to the sodium bisulphite, as in cleaning protocols 2 and 3, can enhance the permeability recovery. Further, the permeability recovery of these cleans has been shown to be relatively effective when compared to a standard CIP using 1000 ppm sodium hypochlorite and 2% citric acid separately, as in cleaning protocol 1.

Examples 2 and 3 show the results of cleaning protocols conducted on full-scale water filtration MBR modules made from PVDF hollow fibre membranes operated on a wastewater site.

EXAMPLE 2

Site tests were conducted in comparison to a standard dual CIP protocol to compare the effect of the different cleaning In the case of the standard cleaning protocols (1000 ppm NaOCl followed by 2% citric acid and vice-versa), the first and second cleans with respective chemical solutions commenced with a 20 minute recirculation of the chemical solution through each fouled membrane, followed by a 3 hour period of soaking and gas scouring of the membrane in each solution. In the standard protocols, each solution was separately neutralised for both oxidation capacity and pH separately prior to disposal.

In the case of the cleaning protocol of the present invention (1000 ppm NaOCl de-chlorinated with 0.135% sodium metabisulfite and 0.5% citric acid), the fouled membranes were first treated in a 20 minutes recirculation/3 hour soak/gas scour using 1000 ppm NaOCl. The metabisulfite/citric acid was then added to the membrane tank while the membranes simultaneously underwent another 20-minute recirculation/3-hour soak/gas scour. The metabisulfite neutralised the oxidative capacity of the chlorine residual present in the solution, while the acid species generated by the neutralisation reaction continued to remove inorganic membrane foulants. As is evident from the results of Table 2, the cleaning protocol of the present invention achieves a membrane permeability that is as effective as the membrane recovery achieved by both standard CIP protocols as tested. Again, the percentage improvement value given in Table 2 refers to an improvement relative to the permeability of the membrane fibre before the chemical clean.

TABLE 2

Site cleaning study using different cleaning chemicals

| Clean | Test | Pre-Clean | After 1000 ppm NaOCl | After 2 wt % Citric | After 1000 ppm NaOcl | After dechlorination NaHSO3 then 0.5 wt % citric | % Improvement from pre-clean permeability |
|---|---|---|---|---|---|---|---|
| 1000 ppm Chlorine then 2 wt % Citric | 1 | 236 | 383 | 497 | | | 111 |
| | 2 | 650 | 705 | 980 | | | 51 |
| | 3 | 415 | 476 | 647 | | | 56 |
| 2 wt % Citric followed by 1000 ppm NaOCl | 1 | 214 | | 336 | 408 | | 91 |
| | 2 | 625 | | 762 | 806 | | 29 |
| | 4 | 484 | | 624 | 657 | | 36 |
| 1000 ppm Chlorine then NaSO$_3$ and 0.5 wt % Citric | 1 | 299 | | | 392 | 578 | 93 |
| | 2 | 634 | | | 641 | 907 | 43 |
| | 3 | 742 | | | 787 | 1020 | 37 |

EXAMPLE 3

Figure 3:
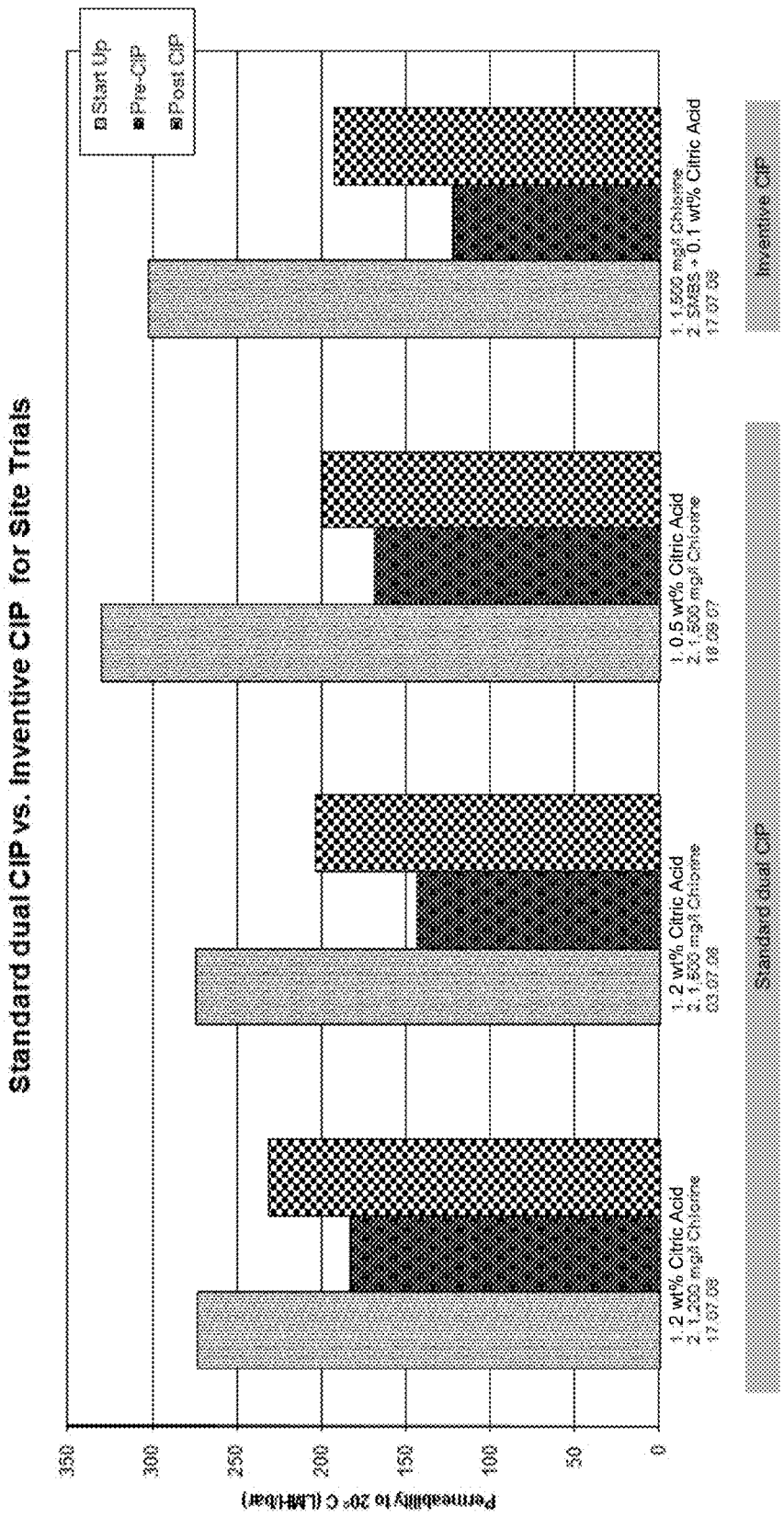
FIG. 3 is a graphical representation of the membrane permeability recovery of different fouled PVDF hollow-fibre membrane modules cleaned on site using different standard CIP protocol compared to modules cleaned with the cleaning protocol of the present invention.

Polymeric microfiltration membrane modules made from PVDF were exposed to a sewage feed water/waste water stream. Following exposure to the feedwater a significant degree of both inorganic and organic fouling had built up on the membrane surface and in the membrane pores. This is evident from the decreased value of membrane permeability, as indicated in Table 3 & FIG. 3 by the 'pre-CIP' value when compared to the initial 'Start-Up' permeability.

Standard dual CIP cleans and a comparison inventive CIP clean were carried out on fouled PVDF hollow-fibre microfiltration modules. The permeability results are graphically shown in FIG. 3, and numerically in Table 3. The pre-cleaning permeability (L/m$^2$/h.bar or LMH/bar) is shown graphically for each module as a baseline for comparison. The first standard dual CIP saw a module cleaned using 2% citric acid followed by 1,200 mg/L NaOCl. The standard cleaning protocol for all cleans involves a 20-minute recirculation followed by a 3 hour soak/gas scour with each chemical solution. The second and third standard dual CIP clean protocols were similar to the first with varying concentrations of citric acid or chlorine. The inventive CIP clean protocol involved 1,500 mg/L NaOCl followed by de-chlorination with SMBS and 0.1% citric acid as an enhancing agent. The membrane permeability recovery of the modules cleaned by the protocol of the present invention was shown to be substantially as effective as the permeability recovery achieved in the standard CIP protocols.

TABLE 3

Comparison with standard dual CIP

| Clean | Permeability (LMH/bar) Original production value | Pre CIP | Post CIP | % recovery from pre-clean permeability |
|---|---|---|---|---|
| Standard dual CIP - 2 wt % Citric and 1200 ppm Chlorine | 274 | 183 | 231 | 26 |
| Standard dual CIP - 2 wt % Citric and 1500 ppm Chlorine | 274 | 143 | 203 | 42 |
| Standard dual CIP - 0.5 wt % Citric and 1500 ppm Chlorine | 330 | 169 | 199 | 18 |

TABLE 3-continued

Comparison with standard dual CIP

| Clean | Permeability (LMH/bar) Original production value | Pre CIP | Post CIP | % recovery from pre-clean permeability |
|---|---|---|---|---|
| 1500 ppm Chlorine then SMBS and 0.1 wt % Citric | 302 | 192 | 192 | 57 |

EXAMPLE 4

Figure 4:
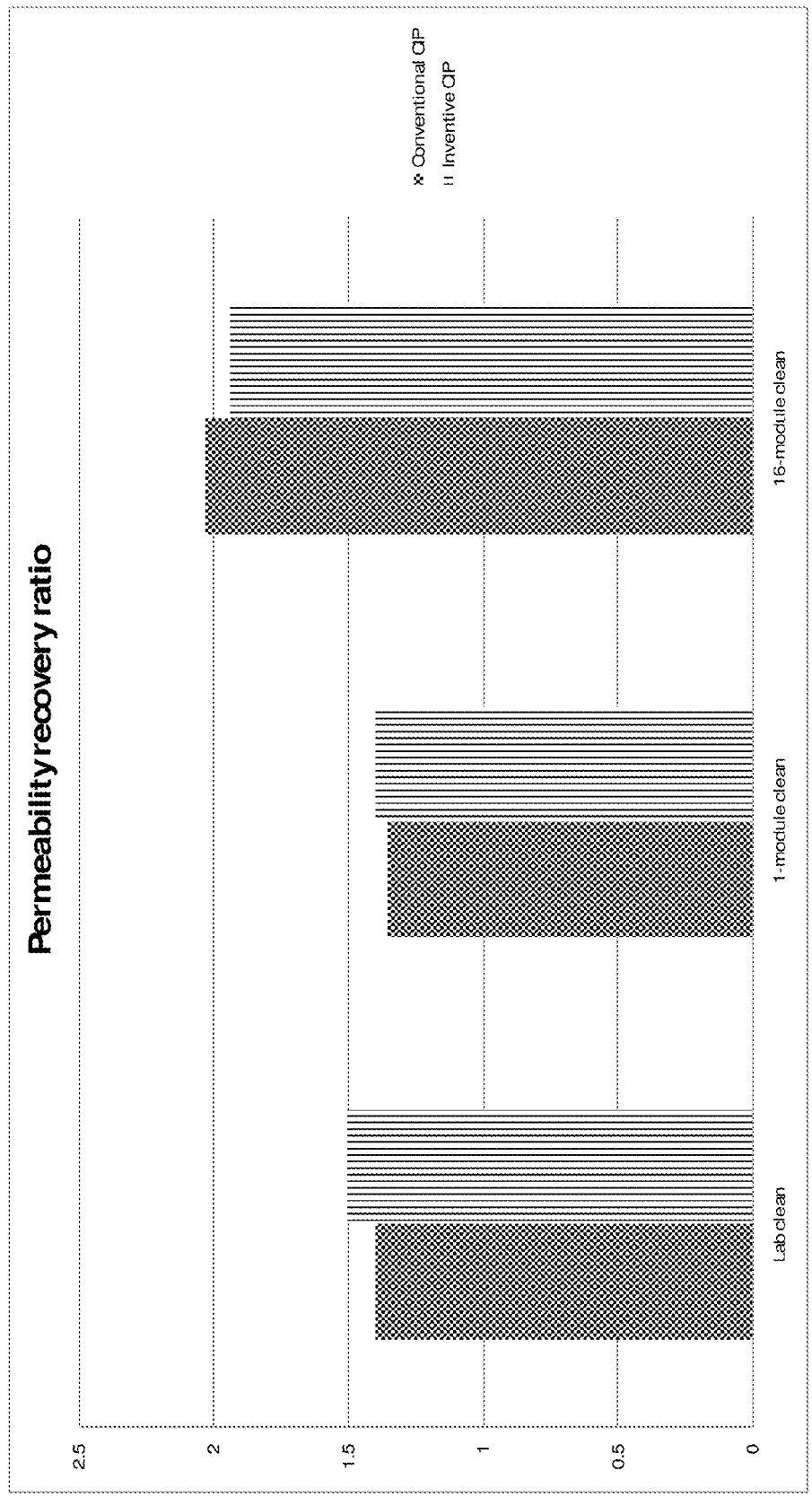
FIG. 4 is a graphical representation of the ratio of post-clean permeability to pre-clean permeability for samples cleaned with the cleaning protocol of the present invention compared to similar samples cleaned with a conventional CIP protocol.

In FIG. 4, data is presented to illustrate the ratio of post-clean membrane permeability to pre-clean membrane permeability generated from laboratory and site cleaning data, using a conventional cleaning protocol and the cleaning protocol of the present invention.

The numerical ratios are presented in Table 4 below. The ratio is calculated based on the permeability of the membrane after undergoing the nominated cleaning protocol divided by the permeability of the membrane before undergoing the nominated cleaning protocol.

TABLE 4

Permeability Recovery (Ratio of post-clean permeability to pre clean permeability)

| | Conventional CIP protocol | De-chlorination CIP protocol |
|---|---|---|
| Lab cleaning trial | 1.40[1] | 1.50[1] |
| Pilot plant cleaning trial (1-module pilot plant) | 1.35[2] | 1.40[2] |
| Pilot plant cleaning trial (16-module pilot plant) | 2.0[3] | 1.9[4] |

Notes for Table 4
[1] average of 3 fibre sample trials; Membrane: PVDF fibre returned from customer site;
[2] average of 2 1-module trials; Membrane: PVDF; data taken on two separate dates;
[3] data from 1 16-module trial; Membrane: PVDF;
[4] data from 1 16-module trial; Membrane: PVDF; same 16-module unit but data taken ~2 months before data taken for 3.

The conventional membrane cleaning protocol referred to in Table 4 uses 2% citric acid to initially recirculate through the membrane and soak the membrane therein for a period of time. This is then followed by a corresponding separate recirculation and soak of the membrane using 1500 ppm sodium hypochlorite. The de-chlorination CIP protocol of the present invention uses 1500 ppm sodium hypochlorite recirculation and soak, with 0.135% sodium metabisulfite/0.5% citric acid then being added to the sodium hypochlorite solution. This mixed solution is recirculated around the membrane and left to soak for a corresponding period of time.

It is evident from the data presented in Table 4, and in corresponding graphical display in FIG. 4, that the de-chlorination cleaning protocol of the present invention effectively recovers the membrane permeability to the same extent as the conventional cleaning protocol of the prior art.

The cleaning protocol of the present invention is shown to achieve equivalent permeability increase to a standard CIP protocol used on polymeric hollow-fibre membranes.

EXAMPLE 5

The following scenarios compare two CIP protocols for a hypothetical MBR plant: One scenario follows a de-chlorination protocol according to the present invention and the other scenario follows a conventional CIP protocol, as previously described.

The plant is assumed to treat 2,000 kL wastewater per day and features membrane cells physically separated from the biological reactor. During a CIP event, the membrane cell concerned is hydraulically isolated from the rest of the plant, drained of mixed liquor (ML) and the chemical cleaning solution is prepared in the cell. The membranes installed in the cell are then soaked in this chemical solution for several hours. Upon completion of the soak, the chemical cleaning solution is drained to the head of works where it mixes with incoming wastewater flows and passes through the biological reactor.

The following calculations assume a membrane cell volume (CIP volume) of 18,000 L.

Described below are reactions between cleaning chemicals only. Reactions between foulants and membrane cleaning chemicals are considered negligible for the purposes of these calculations.

The prices presented are current at the time of writing.
Disclosed CIP:
Inputs and associated costs per clean:

| Item | Amount | Price per unit [AU$] | Price [AU$] |
|---|---|---|---|
| Water (MBR filtrate) | 18,000 L | 0.00005 | 0.90 |
| Sodium Hypochlorite NaOCl 12.5 wt % | 91 kg | 0.80 | 72.00 |
| Sodium Metabisulfite $Na_2S_2O_5$ | 85 kg | 1.50 | 127.50 |
| Citric Acid[1] $C_6H_8O_7$ | 90 kg | 3.18 | 286.00 |
| Sodium Hydroxide NaOH 35 wt % | 106 kg | 1.25 | 63.00 |
| Total | | | 549.38 |

Remark: [1]addition of citric acid might be able to be avoided for certain plants.

Waste Per Clean:
Step 1: Chlorine solution from first step contains the following Chlorine species:
27 kg of $Cl_2$ contained in 18,000 L of 1,500 mg/L Chlorine solution
2.11E-5 kg $NH_2Cl$ assuming 1,800 L ML (10% of CIP volume) remaining on tank walls and within modules; $NH_3$ conc. of ML 0.2 mg/l.
Reacting as $NaOCl+NH_3 \rightarrow NH_2Cl+NaOH$
Step 2: Chlorine species in the solution are de-chlorinated:

$$Na_2S_2O_5+Cl_2+3H_2O \rightarrow 2NaHSO_4+4HCl$$

and $$Na_2S_2O_5+2NH_2Cl+3H_2O \rightarrow Na_2SO_4+H_2SO_4+Cl^-+2NH_4^+$$

forming a total of:
55.3 kg HCl
54.3+2.11E-5≈54.3 kg $Na_2SO_4$ (Sodium Sulfate) (salt)
0.002 kg $H_2SO_4$
0.002 kg $NH_4Cl$ (Ammonium Chloride) (salt)
Also, citric acid is added to a total concentration of 0.5%:
90 kg $C_6H_8O_7$
Step 3: acid is neutralised:

$$HCl+NaOH \rightarrow H_2O+NaCl$$

and $$NaHSO_4+NaOH \rightarrow Na_2SO_4+H_2O$$

and $$H_2SO_4+2NaOH \rightarrow 2H_2O+Na_2SO_4$$

and $$C_6H_8O_7+3NaOH \rightarrow Na_3C_6H_5O_7+3H_2O$$

forming a total of:
44.4 kg NaCl (Table salt)
53.96+2.91E-5≈53.96 kg $Na_2SO_4$ (Sodium Sulfate) (salt)
120 kg $Na_3C_6H_5O_7$ (Sodium Citrate) (salt)
The final discharge of conditioned chemical solution contains:
54.3+53.96=108.3 kg $Na_2SO_4$ (Sodium Sulfate) (salt)
44.4 kg NaCl (Table salt)
120 kg $Na_3C_6H_5O_7$ (Sodium Citrate) (salt)[1]
Negligible amounts of $NH_4Cl$ Ammonium Chloride (salt)
Note: [1] nil if no citric acid is added.
Conventional CIP:
In comparison to the composition and cost of waste discharged from a de-chlorination CIP protocol of the present invention, the same calculations are shown for a conventional CIP protocol under otherwise identical conditions.
Inputs and associated costs per clean:

| Item | Amount | Price per unit [AU$] | Price [AU$] |
|---|---|---|---|
| Water (MBR filtrate) | 36,000 L | 0.00005 | 1.80 |
| Sodium Hypochlorite NaOCl 12.5 wt % | 91 kg | 0.80 | 72.00 |
| Citric Acid $C_6H_8O_7$ | 90 kg | 3.18 | 286.00 |
| Sulphuric Acid $H_2SO_4$ 98 wt % | 30 kg | 15.20 | 246.00 |
| Total | | | 606.00 |

The final discharge of chemical solution contains:
18,000 L of ~pH 10.0, oxidising solution
18,000 L of ~pH 2.0 solution These conventional CIP solutions could not readily be fed into the biological reactor as this could upset the microbiology of the treatment plant. Further, conditioning these solutions before discharge would require chemicals similar to the ones described in the de-chlorination CIP protocol, incurring additional costs.

It is evident from the calculations presented in Example 5 that the de-chlorination protocol in accordance with one or more embodiments provides both cost saving (~10%) and reduction in the wastewater discharge volume (~50%) when compared to a conventional CIP protocol for the same plant. Moreover, the disclosed protocol produces solutions that can be fed back into the head of a treatment plant, including membrane bioreactor filtration plants.

Many modifications may be made without departing from the basic spirit of the present invention. Accordingly, it will be appreciated by those skilled in the art that the invention may be practiced other than has been specifically described herein.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for cleaning a porous polymeric membrane contained in a tank of a wastewater treatment plan including a membrane bioreactor, the method comprising:
    introducing a first cleaning solution including a chlorine-based oxidizing agent selected from the group consisting of chlorine, hypochlorites, chlorites, chlorates, perchlorates, and chloramines to a tank containing the membrane;
    contacting at least a portion of the membrane with the first cleaning solution for a first time period;
    introducing a second cleaning solution including a reducing agent directly to the tank containing the membrane and the first cleaning solution after the first time period has elapsed, the second cleaning solution neutralizing an oxidizing residual of the first cleaning solution and forming an acid species from a reaction between the first cleaning solution and the second cleaning solution;
    soaking at least a portion of the membrane with the acid species for a second time period; and
    discharging a solution including the acid species from the tank after the second time period has elapsed;
    adjusting the pH level of the discharged solution including the acid species;
    introducing the discharged acid species into a head of the wastewater treatment plant; and
    mixing the discharged acid species with an incoming wastewater flow into the wastewater treatment plant.

2. The method of claim 1, wherein the membrane is a hollow-fiber membrane.

3. The method of claim 1, wherein the oxidizing agent is selected from the group consisting of sodium hypochlorite and monochloramine.

4. The method of claim 1, wherein the reducing agent is selected to neutralize the oxidizing residual from the oxidizing agent.

5. The method of claim 4, wherein the reducing agent is selected from the group consisting of bisulphites, metabisulfites, sulphites, and thiosulfates.

6. The method of claim 5, wherein the reducing agent is selected from the group consisting of sodium metabisulfite, sodium thiosulphate, and sodium bisulfite.

7. The method of claim 1, wherein the second cleaning solution further includes an enhancing agent.

8. The method of claim 7, wherein the enhancing agent is a surfactant or a chelating agent selected from the group consisting of polycarboxylic acids and salts thereof.

9. The method of claim 7, wherein the enhancing agent is selected from the group consisting of citric acid, a salt thereof, ethylenediaminetetraacetic acid (EDTA), a salt thereof, oxalic acid, and a salt thereof.

10. The method of claim 7, wherein a concentration of the enhancing agent is between 0.01 wt % and 1.0 wt %.

11. The method of claim 10, wherein the concentration of the enhancing agent is 0.5 wt %.

12. The method of claim 1, wherein a concentration of the oxidizing agent in the first cleaning solution is between 0.01 wt % and 2 wt %.

13. The method of claim 12, wherein the concentration of the oxidizing agent in the first cleaning solution is approximately 0.1 wt %.

14. The method of claim 12, wherein a concentration of the reducing agent is between 0.01 wt % and 2 wt %.

15. The method of claim 14, wherein the concentration of the reducing agent is approximately 0.15 wt %.

16. The method of claim 1, wherein the first time period is at least about three hours, and wherein the second time period is at least about two hours.

17. The method of claim 1, wherein the membrane is cleaned at ambient temperature and pressure.

18. The method of claim 1, further comprising recirculating at least one of the first cleaning solution and the acid species in the tank.

19. The method of claim 1, further comprising filtering at least one of the first cleaning solution and the acid species through the membrane from an outside wall of the membrane to a lumen of the membrane.

20. The method of claim 1, further comprising soaking the membrane in the first cleaning solution.

21. The method of claim 1, further comprising air scouring the membrane while contacting the membrane with at least one of the first cleaning solution and the acid species.

22. The method of claim 1, wherein the second solution is introduced while backwashing the membrane.

23. The method of claim 1, wherein the first cleaning solution targets organic membrane foulants, and wherein the acid species targets inorganic membrane foulants.

24. A method of facilitating cleaning of a porous polymeric membrane in place, the porous polymeric membrane being contained in a tank of a wastewater treatment plant including a membrane bioreactor, the method comprising:
providing a first cleaning solution including at least one chlorine-based oxidizing agent selected from the group consisting of chlorine, hypochlorites, chlorites, chlorates, perchlorates, and chloramines and a second cleaning solution including at least one reducing agent; and
providing instructions to:
contact at least a portion of the membrane with the first cleaning solution in a membrane tank for a first time period to target organic membrane foulants;
introduce the second cleaning solution directly to the membrane tank including the first cleaning solution after the first time period has elapsed, a mixture of the first cleaning solution and the second cleaning solution forming an acid species from a reaction between the first cleaning solution and the second cleaning solution;
recirculate the acid species through the membrane; and
contact at least a portion of the membrane with the acid species for a second time period of at least about two hours to target inorganic membrane foulants;
discharge a solution including the acid species after the second time period has elapsed;
adjust a pH level of the discharged solution including the acid species;
introduce the acid species into a head of the wastewater treatment plant after the second time period has elapsed; and
mix the acid species with an incoming wastewater flow into the wastewater treatment plant.

\* \* \* \* \*